(12) United States Patent
Sullivan

(10) Patent No.: US 10,041,772 B1
(45) Date of Patent: Aug. 7, 2018

(54) FISH HARVESTING HEAD

(71) Applicant: Kevin M. Sullivan, Lakemont, GA (US)

(72) Inventor: Kevin M. Sullivan, Lakemont, GA (US)

( * ) Notice: Subject to any disclaimer, the term of this patent is extended or adjusted under 35 U.S.C. 154(b) by 149 days.

(21) Appl. No.: 14/985,534

(22) Filed: Dec. 31, 2015

Related U.S. Application Data

(60) Provisional application No. 62/099,246, filed on Jan. 2, 2015.

(51) Int. Cl.
   *F42B 6/08* (2006.01)
   *A01K 81/00* (2006.01)
   *A01K 81/04* (2006.01)

(52) U.S. Cl.
   CPC .............. *F42B 6/08* (2013.01); *A01K 81/00* (2013.01); *A01K 81/04* (2013.01)

(58) Field of Classification Search
   CPC ......... A01K 81/00; A01K 81/04; A01K 81/06
   USPC ............ 43/5, 6; 294/61, 126, 127, 128, 129, 294/130, 182; 473/578, 582, 583, 584, 473/585, 586
   See application file for complete search history.

(56) References Cited

U.S. PATENT DOCUMENTS

| | | | |
|---|---|---|---|
| 4,742,637 A | | 5/1988 | Musacchia |
| 4,807,382 A | * | 2/1989 | Albrecht ............... F42B 6/02 43/6 |
| 4,819,360 A | * | 4/1989 | Thomas ................. A01K 81/04 43/6 |
| 6,258,000 B1 | * | 7/2001 | Liechty, II ............. F42B 6/08 473/583 |
| 8,128,521 B1 | * | 3/2012 | Ulmer .................... F42B 6/08 473/583 |
| 2010/0004078 A1 | * | 1/2010 | Flanagan ............... F42B 6/08 473/583 |
| 2014/0115945 A1 | * | 5/2014 | Niki ....................... A01K 81/06 43/6 |
| 2014/0187364 A1 | * | 7/2014 | Hand ...................... F42B 6/08 473/583 |
| 2015/0094175 A1 | * | 4/2015 | Sullivan ................. F42B 6/08 473/583 |
| 2016/0047637 A1 | * | 2/2016 | Salvino .................. F42B 6/08 473/583 |
| 2016/0084622 A1 | * | 3/2016 | Ford ....................... F42B 6/08 473/583 |

* cited by examiner

*Primary Examiner* — Darren W Ark
*Assistant Examiner* — Brady W Frazier
(74) *Attorney, Agent, or Firm* — Akerman LLP; Michael K. Dixon

(57) ABSTRACT

A fish harvesting head is disclosed having one or more barb arms protruding from barb receiving slots in a harvesting body, wherein one or more barb arms includes one or more gripper arms extending from at least one barb arm nonorthogonal and nonparallel with the barb arm to prevent the fish harvesting head from inadvertently being pulled free from a target. The gripper arm may extend at a compound angle from a side surface of the barb arm. The gripper arm may also be nonlinear such that the gripper arm mates with an outer surface of the fish harvesting head when the barb arm is in a closed position against the harvesting body. In such a position, the gripper arm assists the barb arm in staying in a closed position while the fish harvesting head is driven into a target, such as, but not limited to a fish.

17 Claims, 12 Drawing Sheets

FISH HARVESTING HEAD

CROSS-REFERENCE TO RELATED APPLICATION

This application claims the benefit of U.S. Provisional Patent Application No. 62/099,246, filed on Jan. 2, 2015.

FIELD OF THE INVENTION

This invention is directed generally to fish harvesting systems, and more particularly to tips such as arrowheads usable for bowfishing and spearfishing tips.

BACKGROUND

Bowfishing equipment has been used throughout the years to successfully harvest fish of all varieties. Typically, an arrow used for bowfishing includes an arrowhead with a barb for keeping the fish attached to the arrow once shot. One such example is disclosed in U.S. Pat. No. 4,742,637. The '637 patent discloses a bowfishing arrowhead formed from a tip with a rotatable barb. The rotatable barb is confined in a hole in the arrowhead and is not removable. The bowfishing head of the '637 patent also includes a threaded tip. The tip may be placed into position to prevent rotation of the barb.

SUMMARY OF THE INVENTION

A fish harvesting head is disclosed having one or more barb arms protruding from barb receiving slots in a harvesting body, wherein one or more barb arms includes one or more gripper arms extending from at least one barb arm nonorthogonal and nonparallel with the barb arm to prevent the fish harvesting head from inadvertently being pulled free from a target. The gripper arm may extend at a compound angle from a side surface of the barb arm. The gripper arm may also be nonlinear such that the gripper arm mates with an outer surface of the fish harvesting head when the barb arm is in a closed position against the harvesting body. In such a position, the gripper arm assists the barb arm in staying in a closed position while the fish harvesting head is driven into a target, such as, but not limited to, a fish.

In at least one embodiment, a fish harvesting head may be formed from a harvesting body having a forward portion and a rear portion, wherein the forward portion includes a forward connection device and the rear portion includes a rear connection device for attachment to a shaft. The fish harvesting head may include a plurality of barb receiving slots positioned in the forward portion of the harvesting body, wherein each barb receiving slot extends along the harvesting body and includes an opening in an outer surface of the harvesting body through which a portion of a barb arm protrudes. The fish harvesting head may include one or more barb arms protruding from each barb receiving slot. One or more of the barb arms may have at least one proximal end attached to the harvesting body in the barb receiving slot via at least one connector extending from a first receiver in a first side of the barb receiving slot, through an orifice in the barb arm, and into a second receiver in a second side of the barb receiving slot. The fish harvesting head may also include one or more gripper arms extending from the barb arm nonorthogonal and nonparallel with the at least one barb arm.

The gripper arm may extend at a nonorthogonal and nonparallel angle relative to the at least one barb arm in a first direction relative to a longtitudinal axis of the harvesting body and may extend at a nonorthogonal and nonparallel angle relative to the barb arm in a second direction relative to the longtitudinal axis of the harvesting body that is orthogonal to the first direction. The gripper arm may be nonlinear such that the gripper arm may be curved to mate with an outer surface of the harvesting body when the barb arm with the gripper arm is in a closed positioned against the harvesting body. The gripper arm may be formed from a base section and a tip section, whereby the base section may be nonparallel and nonorthogonal with the tip section. The tip section may extend from a distal end of the base section more in a direction towards a base of the harvesting body than the base section. A leading edge of the gripper arm may be tapered to reduce drag and to create a force directed toward the longitudinal axis of the harvesting body when the harvesting body is driven into a body, such as a fish, to keep the at least one gripper arm and the barb arm to which the gripper arm is attached resting against the harvesting body while the harvesting body is driven into a body.

In at least one embodiment, the gripper arm may have a length less than one half a length of the barb arm to which the gripper arm is attached. In at least one embodiment, the barb arm may include a gripper arm. The barb arm may be configured to pivot between a closed position generally parallel to a longitudinal axis of the harvesting body and an open position generally orthogonal to a longitudinal axis of the harvesting body. The forward portion of the harvesting body may have a distal piercing tip including a releasable connection device attachable to the connection device on the forward portion of the harvesting body for removably securing the piercing tip to the harvesting body and for preventing rotation of the barb arms forward beyond a generally orthongonal position relative to the longitudinal axis of the harvesting body.

An advantage of this fish harvesting head is that the gripper arm provides additional barb surface holding area with minimal additional drag.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 3:
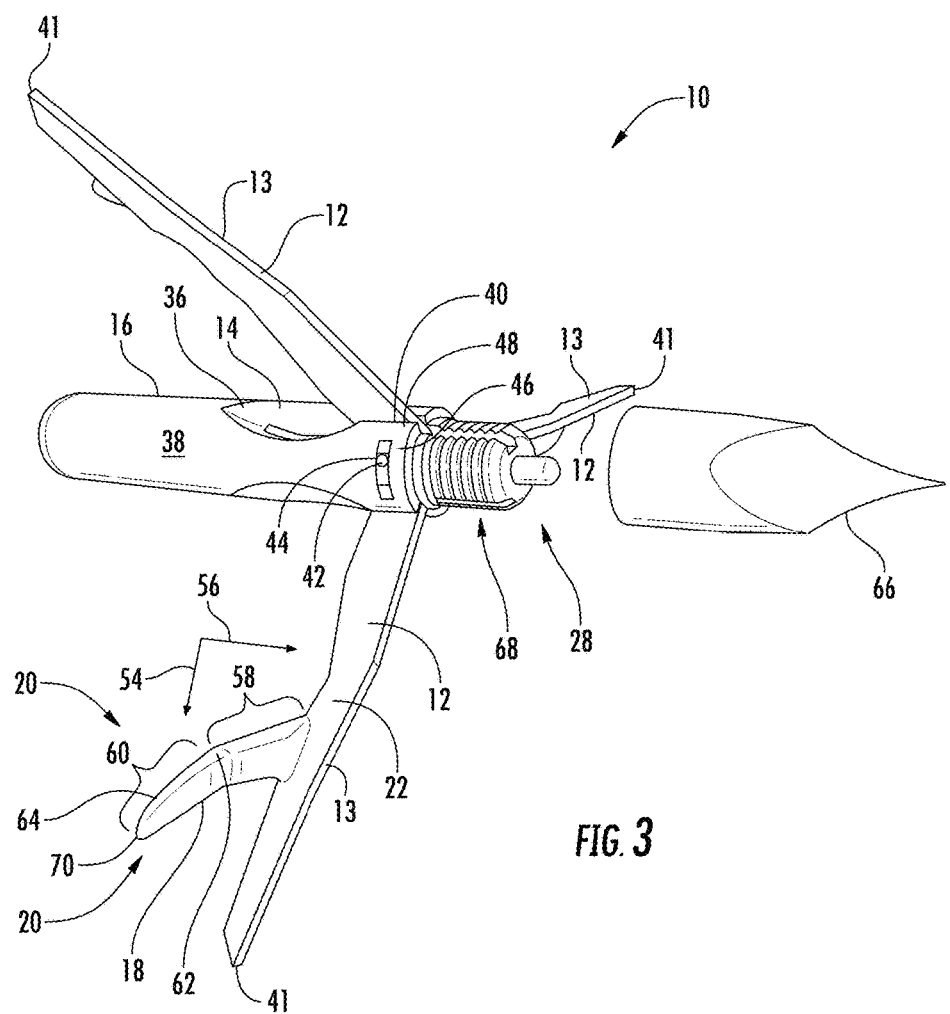
FIG. 3 is a frontal, exploded perspective view of the fish harvesting head in the open position.
Figure 4:
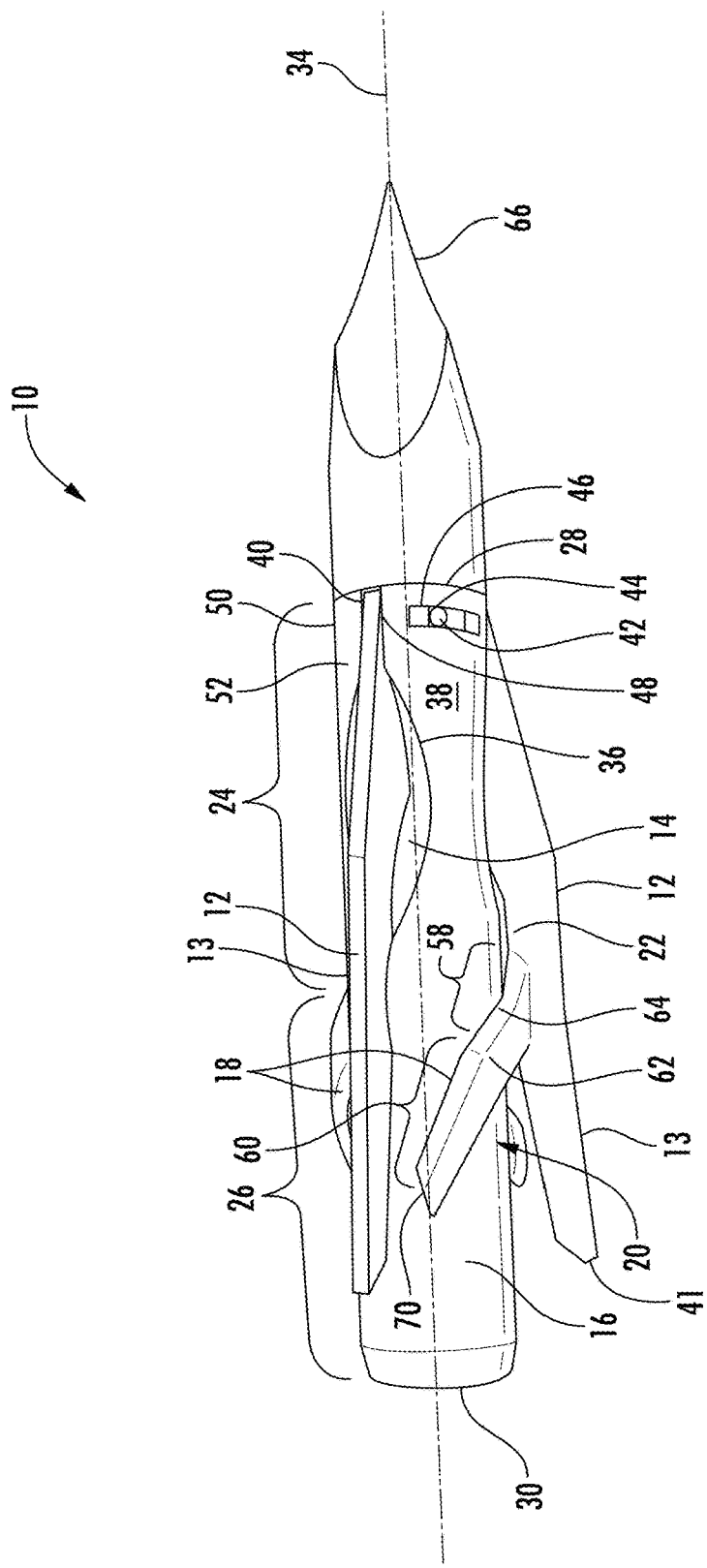
FIG. 4 is a top view of the fish harvesting head in a closed fish penetrating position.
Figure 5:
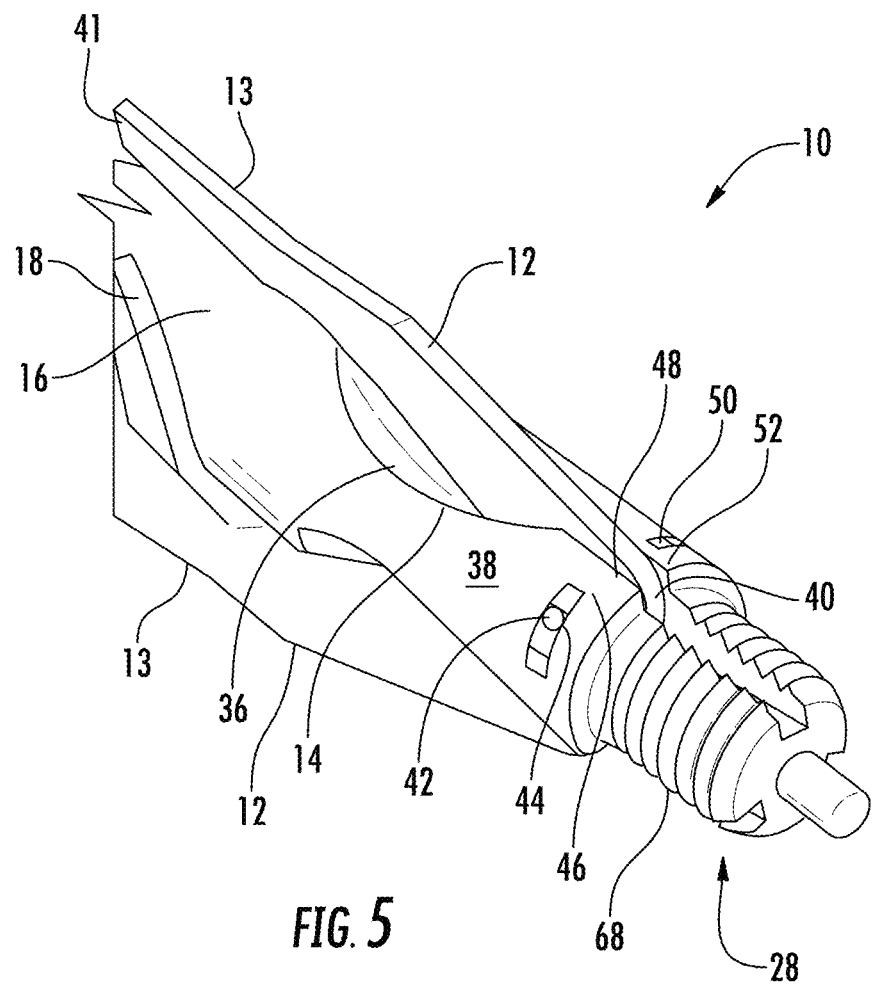
FIG. 5 is a perspective view with the piercing tip removed and the fish harvesting head in a closed fish penetrating position.

As shown in FIGS. 1-15, a fish harvesting head 10 is disclosed having one or more barb arms 12 protruding from barb receiving slots 14 in a harvesting body 16, wherein one or more barb arms 12 includes one or more gripper arms 18 extending from at least one barb arm 12 nonorthogonal and nonparallel with the barb arm 12 to prevent the fish harvesting head 10 from inadvertently being pulled free from a target. The gripper arm 18 may extend at a compound angle 20 from a side surface 22 of the barb arm 12, as shown in FIGS. 1, 2, 6, 7 and 8. The gripper arm 18 may also be nonlinear such that the gripper arm 18 mates with an outer surface 38 of the fish harvesting head 10 when the barb arm 12 is in a closed position against the harvesting body 16, as shown in FIGS. 4 and 5. In such a position, the gripper arm 18 assists the barb arm 12 in staying in a closed position while the fish harvesting head 10 is driven into a target, such as, but not limited to, a fish.

Figure 1:
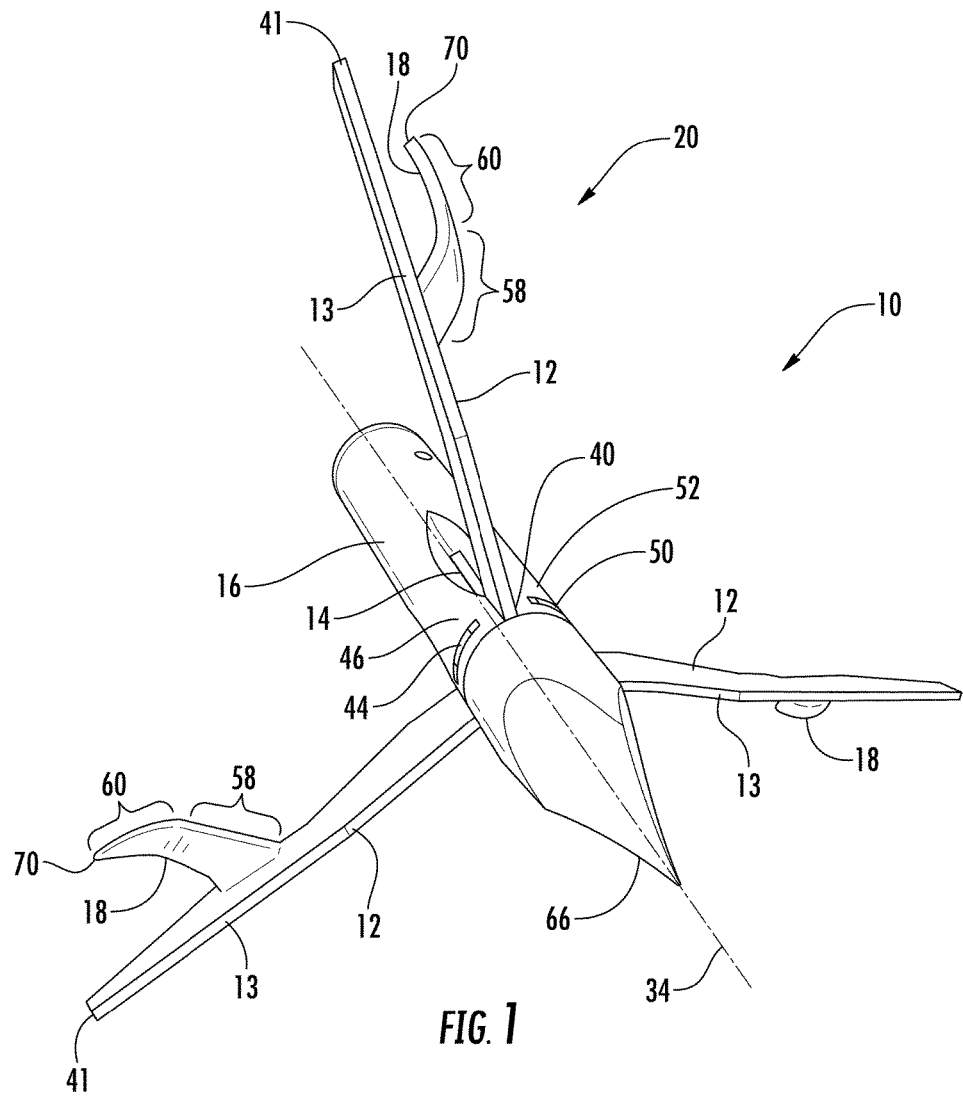
FIG. 1 is a frontal perspective view of the fish harvesting head in an open position, also known as a fish retaining position.
Figure 2:
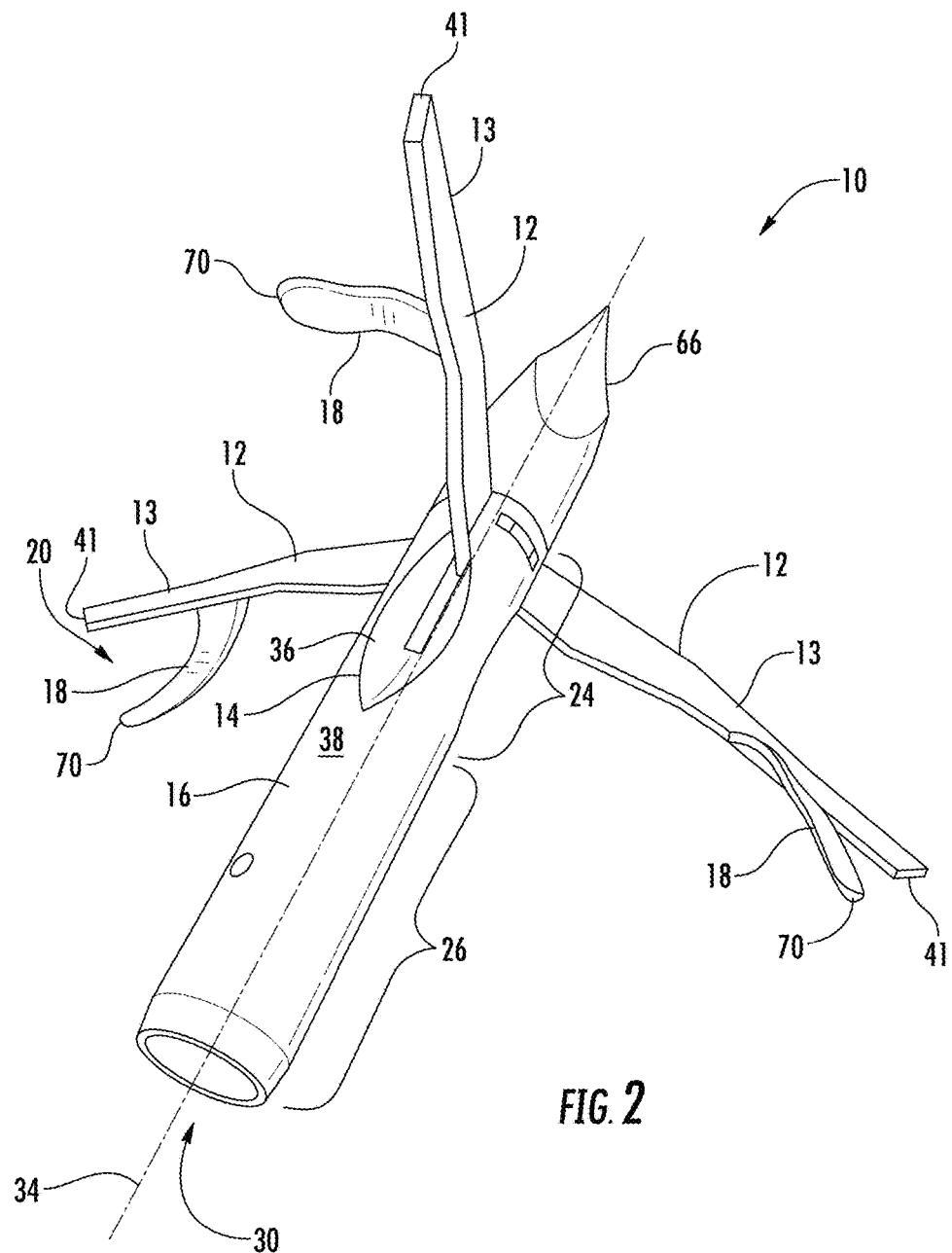
FIG. 2 is a rear perspective view of the fish harvesting head in the open position.
Figure 6:
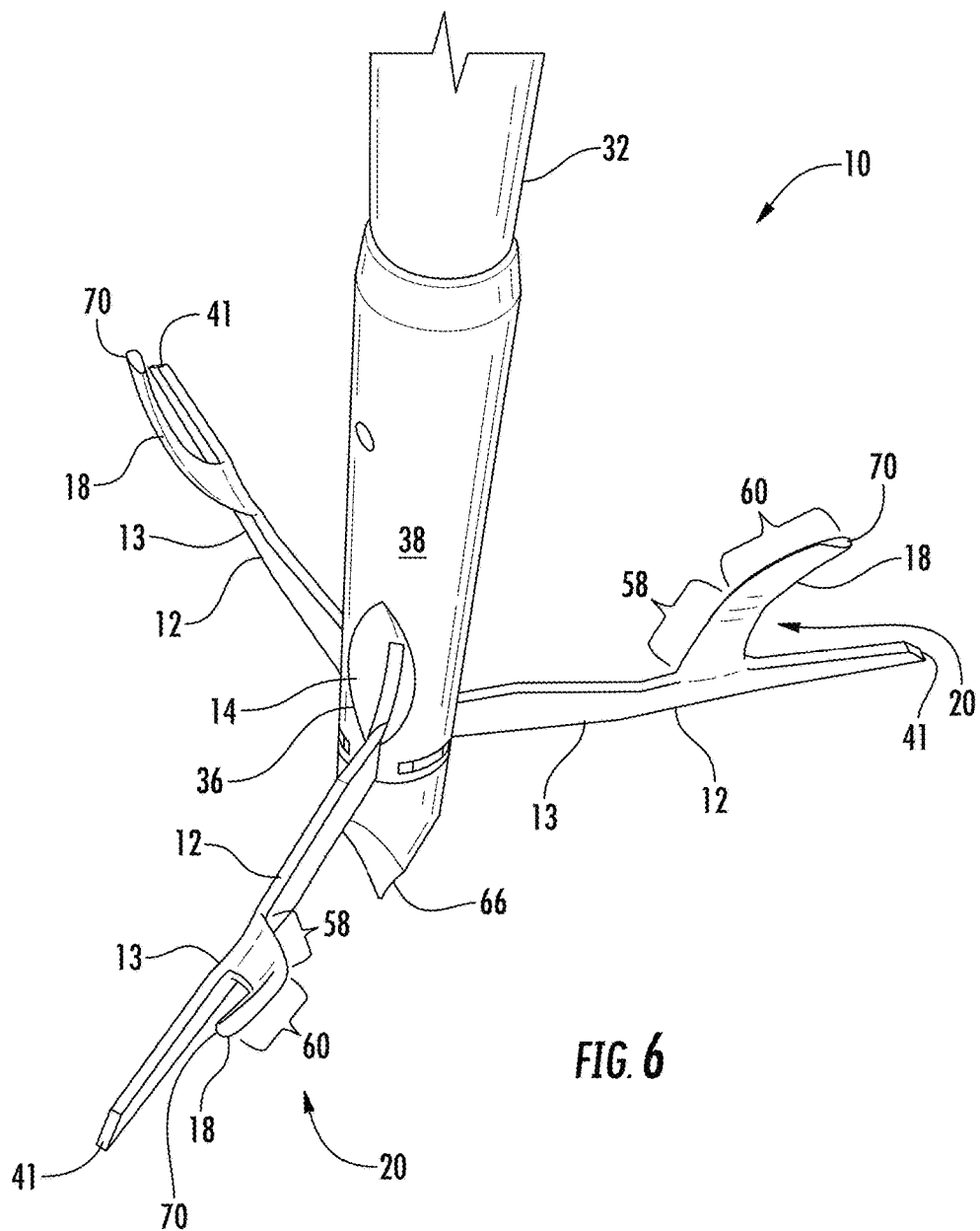
FIG. 6 is a rear perspective view of the fish harvesting head in the open position.
Figure 7:
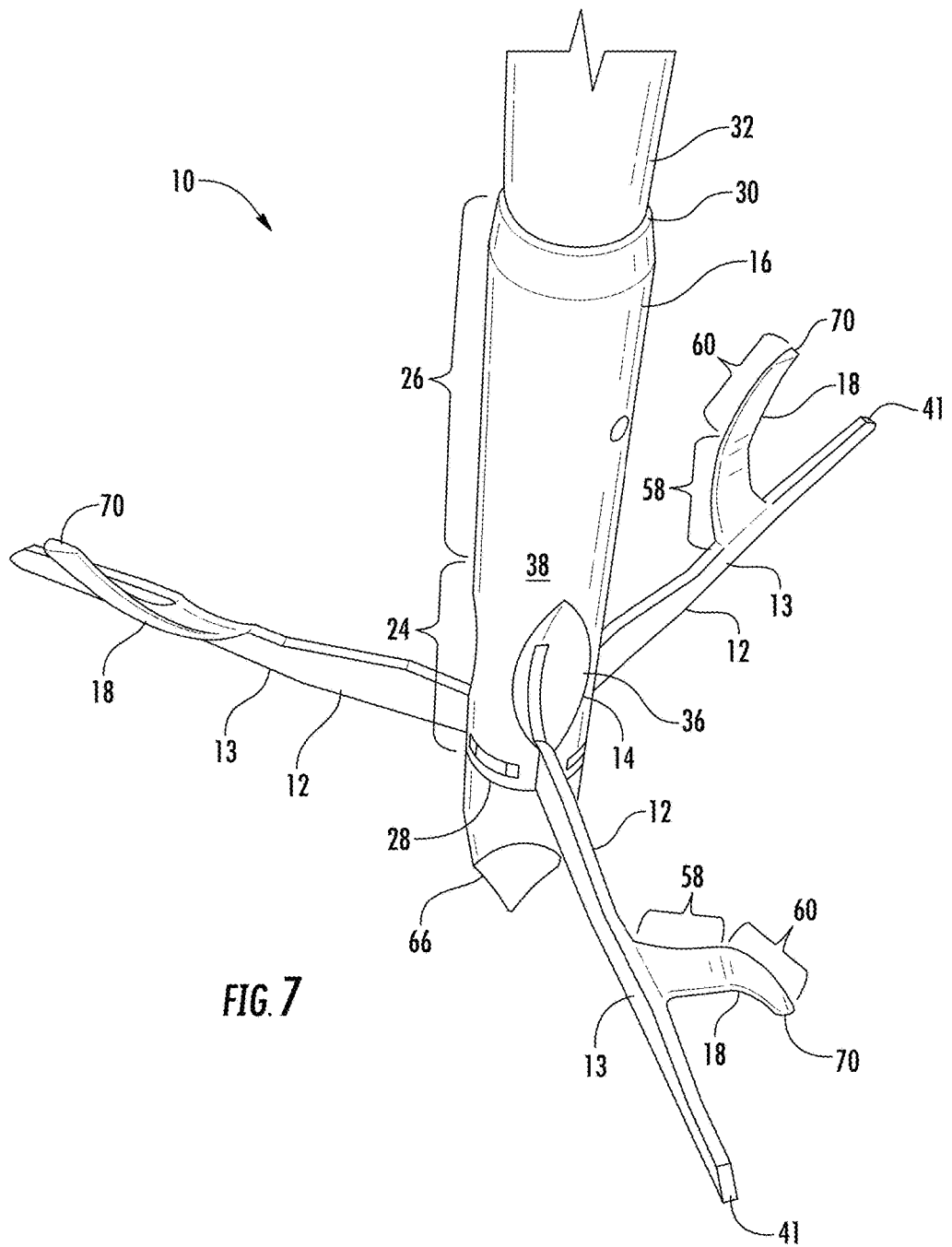
FIG. 7 is another rear perspective view of the fish harvesting head in the open position rotated slightly from the position in FIG. 6.

In at least one embodiment, the fish harvesting head 10 may include a harvesting body 16 having a forward portion 24 and a rear portion 26. The forward portion 24 may include a forward connection device 28, as shown in FIG. 3, and the rear portion 26 may include a rear connection device 30, as shown in FIG. 2, for attachment to a shaft 32, as shown in FIG. 6. The plurality of barb receiving slots 14 may be positioned in the forward portion 24 of the harvesting body 16. One or more, or each, of the barb receiving slots 14 may extend parallel to a longitudinal axis 34 of the harvesting body 16 and may include an opening 36 in an outer surface 38 of the harvesting body 16 through which a portion of a barb arm 12 protrudes. In other embodiments, the barb receiving slots 14 may be positioned nonparallel with the longitudinal axis 34 of the harvesting body 16, as shown in FIGS. 1 and 2. One or more barb arms 12 may protrude from each barb receiving slot 14. One or more barb arms 12 may have at least one proximal end 40, as shown in FIGS. 1, 3, 4 and 5, attached to the harvesting body 16 in the barb receiving slot 14 via one or more pins 42 extending from a first receiver 44 in a first side 46 of the barb receiving slot 14, through an orifice 48 in the barb arm 12, and into a second receiver 50 in a second side 52 of the barb receiving slot 14. The barb arm 12 may pivot between a closed position generally parallel to a longitudinal axis 34 of the harvesting body 16 and an open position generally orthogonal to the longitudinal axis 34 of the harvesting body 16. The forward portion 24 of the harvesting body 16 may have a distal piercing tip 66 including a releasable connection device 68, as shown in FIG. 3, attachable to the connection device 28 on the forward portion 24 of the harvesting body 16 for removably securing the piercing tip 66 to the harvesting body 16 and for preventing rotation of the barb arms 12 forward beyond a generally orthongonal position relative to the longitudinal axis 34 of the harvesting body 16.

Figure 15:
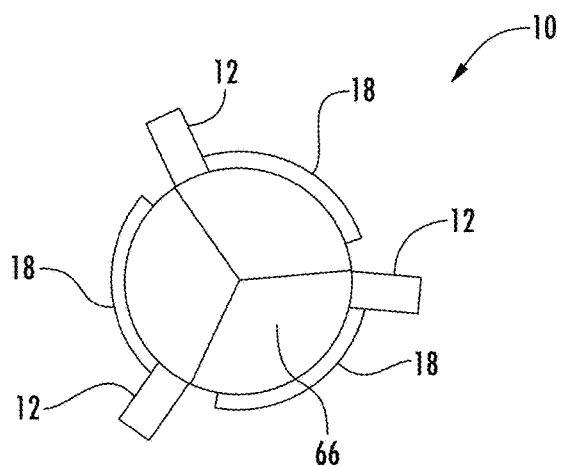
FIG. 15 is a frontal view of the fish harvesting head in a closed fish penetrating position in which the barb arms rest against the harvesting head body and the gripper arms are curved partially around the harvesting head body to reduce drag through the air and friction through a body, such as, but not limited to, a fish.

In at least one embodiment, there may be three barb arms 12 extending from the harvesting body 16. The barb arms 12 may be separated by about 120 degrees about the longitudinal axis 34 of the harvesting body 16, as shown in FIG. 15. There may also be three gripper arms 18 extending from the barb arms 12 nonorthogonal and nonparallel with the barb arm 12. Each barb arm 12 may include a single gripper arm 18. In other embodiments, the fish harvesting head 10 may include more than one gripper arm 18 on a barb arm 12.

Figure 8:
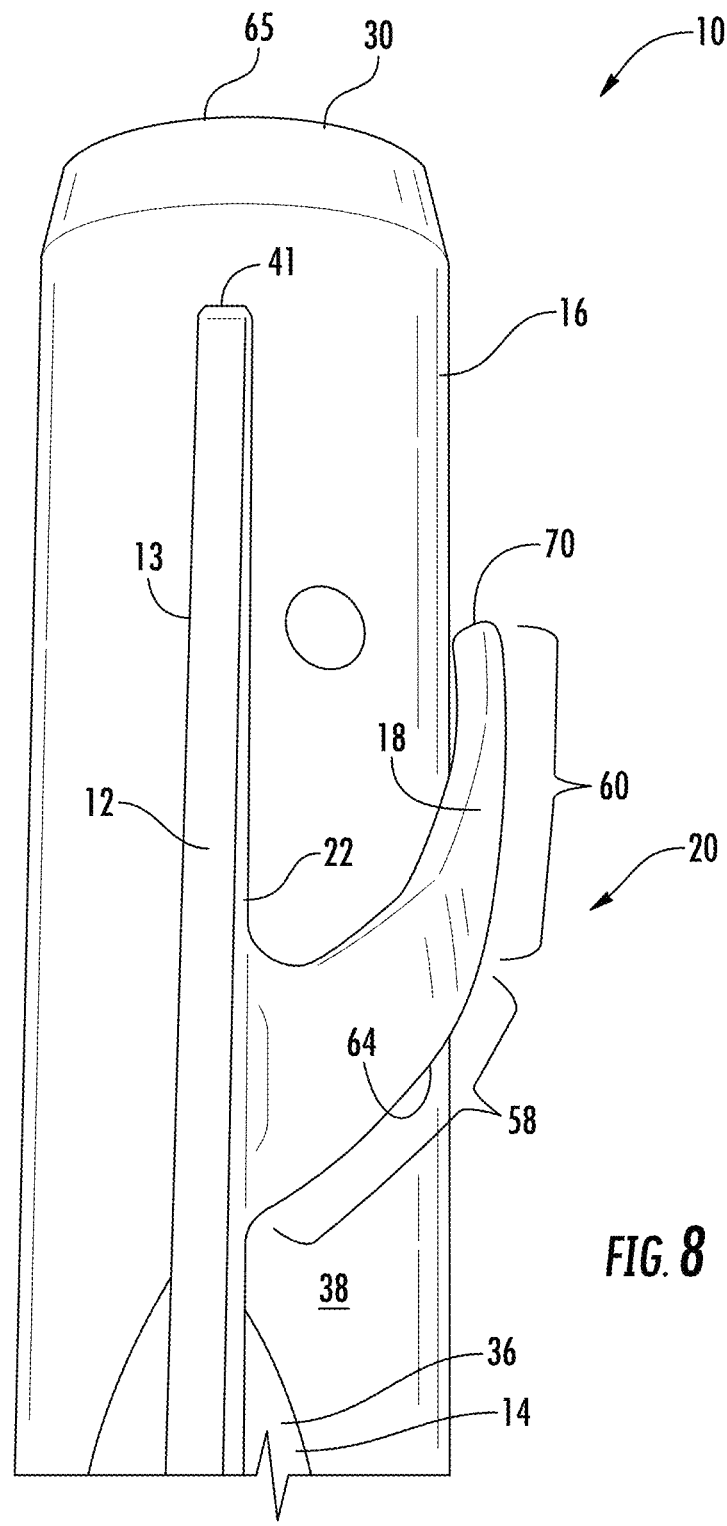
FIG. 8 is a detail view of the rear portion of the fish harvesting body.

The fish harvesting head 10 may include one or more gripper arms 18 extending from at least one barb arm 12 nonorthogonal and nonparallel with the barb arm 12. The gripper arm 18 may extend at a nonorthogonal and nonparallel angle relative to the barb arm 12 in a first direction 54, as shown in FIG. 3, relative to a longitudinal axis 34 of the harvesting body 16 and may extend at a nonorthogonal and nonparallel angle relative to the barb arm 12 in a second direction 56 relative to the longitudinal axis 34 of the harvesting body 16 that is orthogonal to the first direction 54. As such, the gripper arm 18 may extend from the barb arm 12 at a compound angle. The gripper arm 18 may be nonlinear such that the gripper arm 18 may be curved to mate with an outer surface 38 of the harvesting body 16 when the barb arm 12 with the gripper arm 18 is in a closed position against the harvesting body 16, as shown in FIGS. 4, 8 and 9-15. The gripper arm 18 may be formed from a base section 58 and a tip section 60, as shown in FIGS. 1, 3, 4 and 6. The base section 58 may be nonparallel and nonorthogonal with the tip section 60. The tip section 60 may extend from a distal end 62 of the base section 58 more in a direction towards a proximal end 65 of the harvesting body 16, as shown in FIG. 8, than the base section 58. The tip section 60 may be nearly aligned with the barb arm 12 which supports the tip section 60. In at least one embodiment, the tip section 60 may be aligned with the barb arm 12 which supports the tip section, as shown in FIG. 1.

Figure 9:
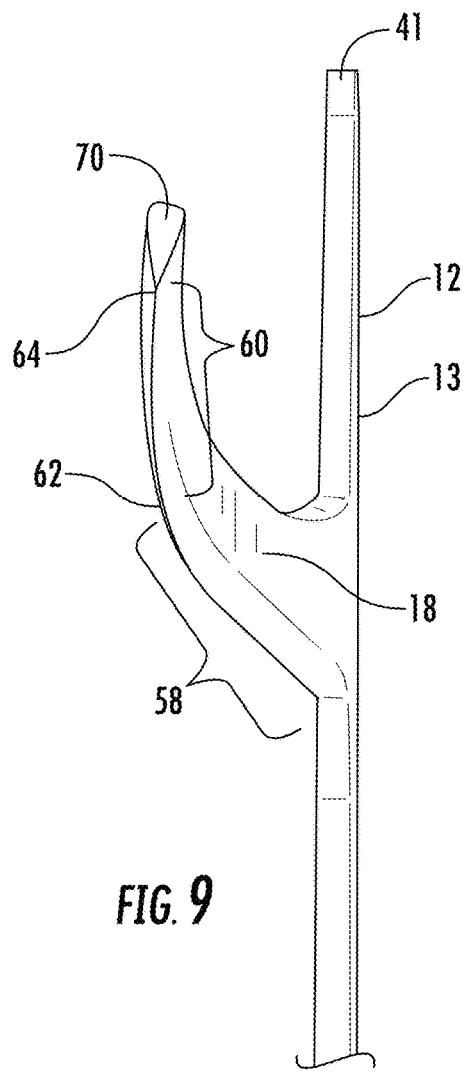
FIG. 9 is a detail view of the gripper arm extending from the barb arm.
Figure 10:
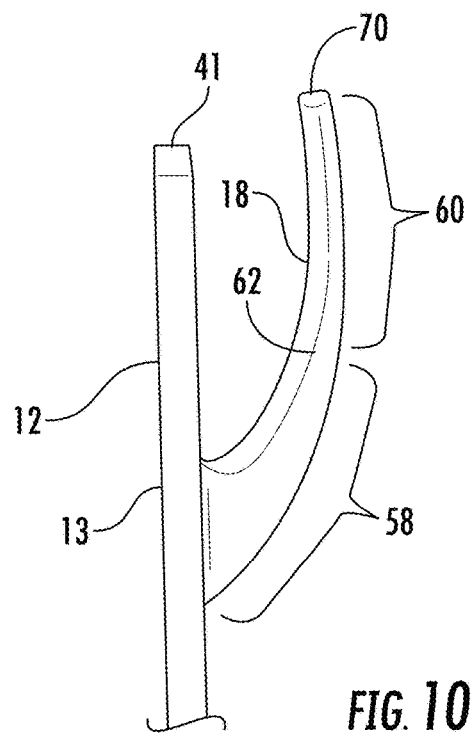
FIG. 10 is a detail view of the gripper arm extending from the barb arm, whereby the view is rotated 180 degrees from the view in FIG. 9.
Figure 11:
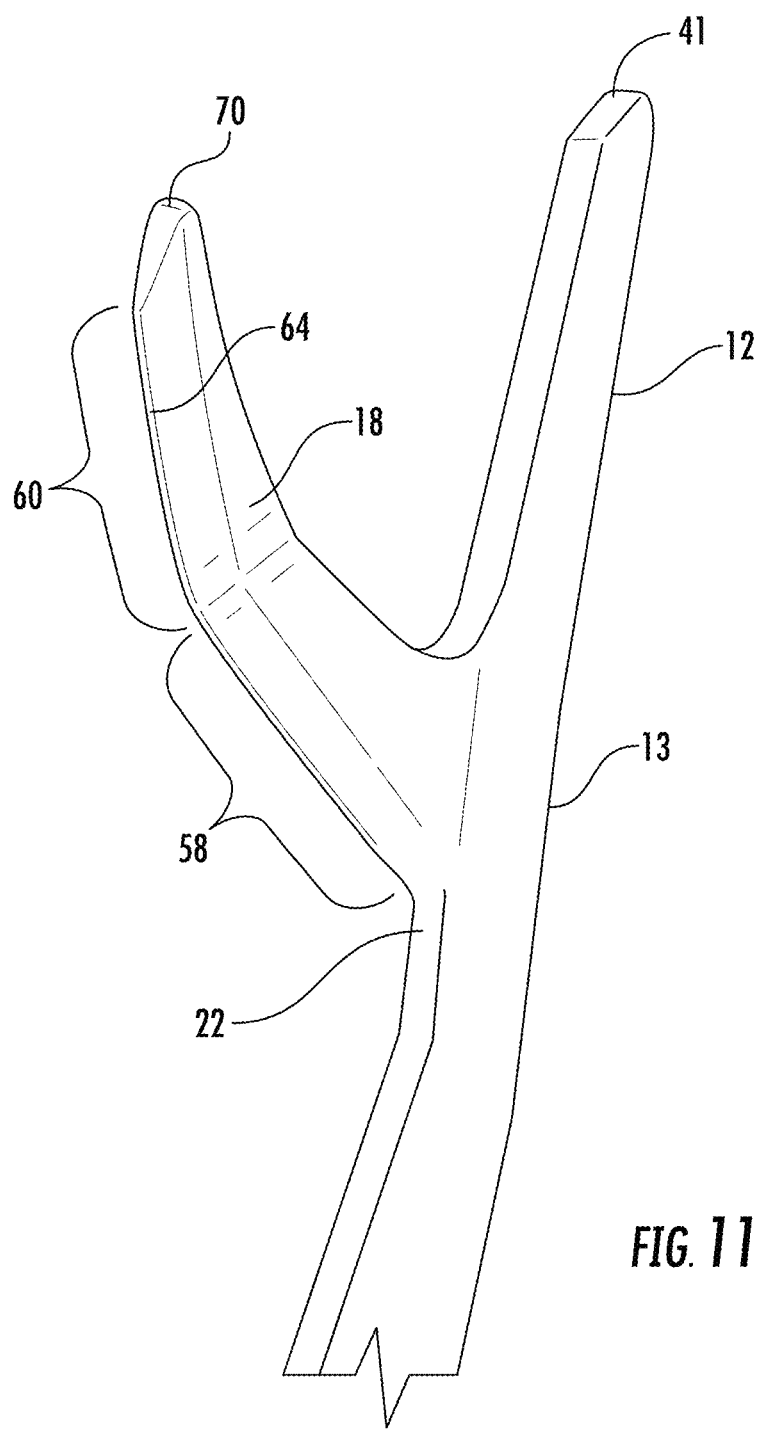
FIG. 11 is a perspective view of the gripper arm extending from the barb arm.
Figure 12:
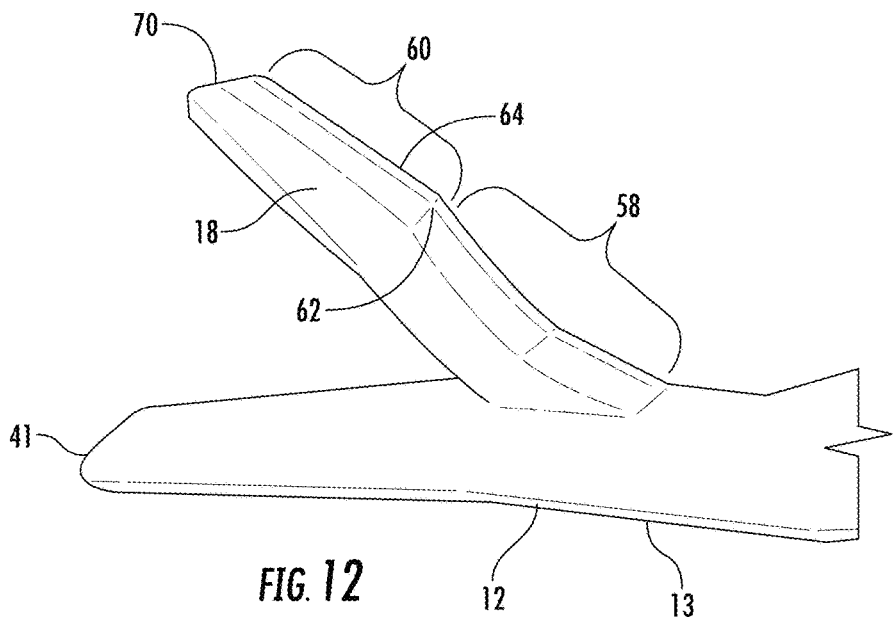
FIG. 12 is a perspective view of the gripper arm extending from the barb arm, whereby the view is rotated about 90 degrees from the view in FIG. 11.
Figure 13:
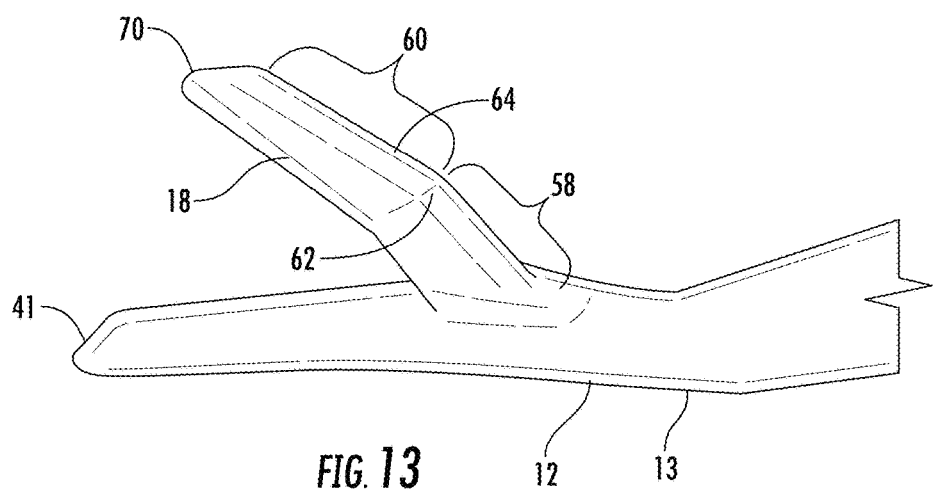
FIG. 13 is a perspective view of the gripper arm extending from the barb arm.
Figure 14:
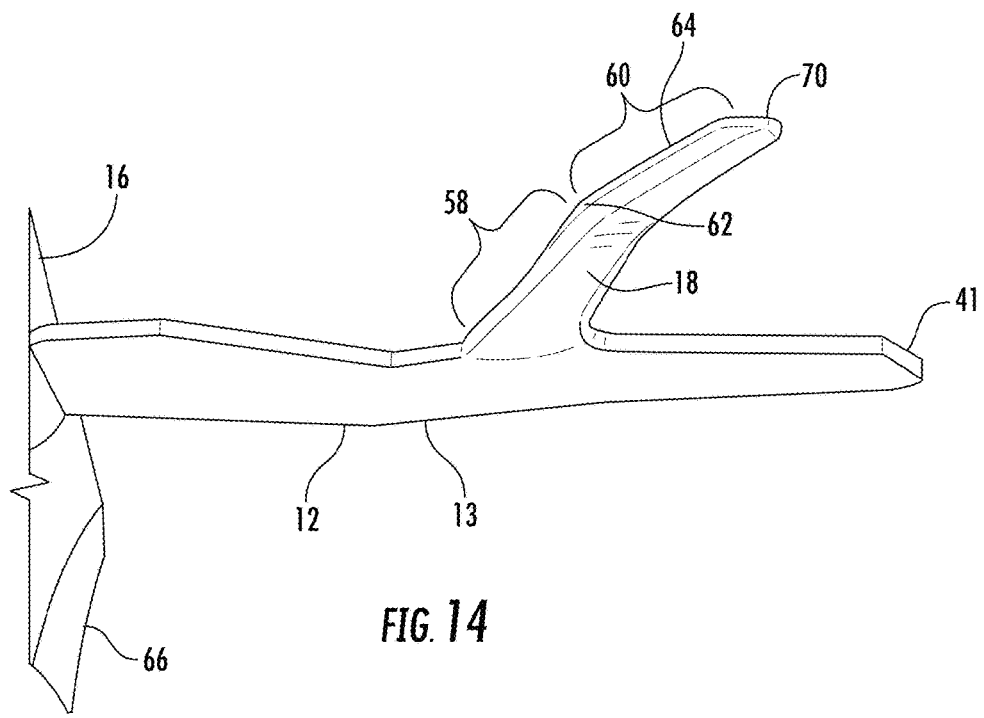
FIG. 14 is another perspective view of the gripper arm extending from the barb arm, whereby the view is rotated about 90 degrees from the view in FIG. 13.

A leading edge 64 of the gripper arm 18, as shown in FIG. 9, may be tapered to reduce drag and to create a force directed toward the longitudinal axis 34 of the harvesting body 16 when the harvesting body 34 is driven into a body, such as, but not limited to, a fish, to keep the gripper arm 18 and the barb arm 12 to which the gripper arm 18 is attached resting against the harvesting body 16 while the harvesting body 16 is driven into a body. The gripper arm 18 may have a length less than one half of a length of the barb arm 12 to which the gripper arm 18 is attached. In at least one embodiment, the gripper arm 18 may have a length less than one quarter of a length of the barb arm 12 to which the gripper arm 18 is attached. In at least one embodiment, each barb arm 12 may include a gripper arm 18.

The barb arm 12 for a shaft point configured to harvest animals may include a barb arm body 13 extending from a proximal end 40 to a distal end 41, whereby the proximal end 40 is configured to be attached to a harvesting body 16 via at least one connector 42. The gripper arm 18 may extend from the barb arm body 13 at an angle that is nonorthogonal and nonparallel with the barb arm 12. The gripper arm 18 may extend from the barb arm body 13 at a compound angle 20. A distal end 70 of the gripper arm 70 may point at least somewhat away from the proximal end 40 of the barb arm body 13. In embodiments in which the gripper arm 18 is formed from a base section 58 and a tip section 60, the base section 58 may extend at a compound angle 20 from the barb arm body 13. The tip section 60 may extend nonparallel and nonorthogonal relative to the base section 58. In at least one embodiment, the tip section 60 may extend generally parallel to the barb arm body 13.

The gripper arm 18 may be attached to the barb arm body 13 at a point within an outer two thirds of a length of the barb arm body 13. In another embodiment, the gripper arm 18 may be attached to the barb arm body 13 at a point within an outer half of a length of the barb arm body 13. In yet another embodiment, the gripper arm 18 may be attached to the barb arm body 13 at a point within an outer third of a length of the barb arm body 13. The gripper arm 18 may also be configured such that the distal end 70 of the gripper arm 18 may be positioned a distance from the barb arm body 13 that is less than a length of the gripper arm 18. In at least one embodiment, the gripper arm 18 may also be configured such that the distal end 70 of the gripper arm 18 may be positioned a distance from the barb arm body 13 that is less than a length of the gripper arm 18.

As shown in FIG. 8, the base section 58 and the tip section 60 of the gripper arm 18 may each be curved. As shown in FIGS. 8 and 15, both the base section 58 and the tip section 60 of the gripper arm 18 may each be curved with the same radius of curvature. In other embodiments, the base section 58 and the tip section 60 of the gripper arm 18 may each be curved with the different radii of curvature. A width of a proximal end of the base section 58 may be narrower than a width of the distal end 62 of the base section. A width of a proximal end of the tip section 60 may be narrower than a width of the distal end 70 of the tip section 60 of the gripper arm 18. In at least one embodiment, as shown in FIG. 8, the distal tip 70 of the gripper arm 18 may terminate before reaching the distal tip 41 of the barb arm 12. In at least one embodiment, the tip section 60 may be misaligned relative to the base section 58 between about two degrees and about 30 degrees. In at least one embodiment, the tip section 60 may be misaligned relative to the base section 58 between about five degrees and about 15 degrees. The base section 58 may be misaligned relative to the fish harvesting body 16 between about 30 degrees and about 80 degrees. In at least one embodiment, the base section 58 may be misaligned relative to the fish harvesting body 16 between about 45 degrees and about 70 degrees.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A fish harvesting head, comprising:
a harvesting body having a forward portion and a rear portion, wherein the forward portion includes a forward connection device and the rear portion includes a rear connection device for attachment to a shaft;
a plurality of barb receiving slots positioned in the harvesting body, wherein each barb receiving slot extends along the harvesting body and includes an opening in an outer surface of the harvesting body through which a portion of a barb arm protrudes;
at least one barb arm protruding from at least one barb receiving slot;
where at least one of the barb arms has at least one proximal end attached to the harvesting body in the at least one barb receiving slot via at least one connector extending from a first receiver in a first side of the at least one barb receiving slot, through an orifice in the barb arm, and into a second receiver in a second side of the at least one barb receiving slot; and
at least one gripper arm extending from at least one barb arm nonorthogonal and nonparallel with the at least one barb arm, wherein the at least one gripper arm at least partially resides out of a plane in which the at least one barb arm resides; and
wherein the at least one gripper arm is nonlinear such that the at least one gripper arm is curved to mate with an outer surface of the harvesting body when the at least one barb arm with the at least one gripper arm is in a closed positioned against the harvesting body.

2. The fish harvesting head of claim 1, wherein the at least one gripper arm extends at a nonorthogonal and nonparallel angle relative to the at least one barb arm in a first direction relative to a longitudinal axis of the harvesting body and extends at a nonorthogonal and nonparallel angle relative to the at least one barb arm in a second direction relative to the longitudinal axis of the harvesting body that is orthogonal to the first direction.

3. The fish harvesting head of claim 1, wherein the at least one gripper arm is formed from a base section and a tip section, and wherein the base section is nonparallel and nonorthogonal with the tip section.

4. The fish harvesting head of claim 3, wherein the tip section extends from a distal end of the base section more in a direction towards a base of the harvesting body than the base section.

5. The fish harvesting head of claim 1, wherein a leading edge of the at least one gripper arm is tapered to reduce drag and to create a force directed toward the longitudinal axis of the harvesting body when the harvesting body is driven into a body, such as a fish, to keep the at least one gripper arm and the at least one barb arm to which the at least one gripper arm is attached resting against the harvesting body while the harvesting body is driven into a body.

6. The fish harvesting head of claim 1, wherein the at least one gripper arm has a length less than one half a length of the barb arm to which the at least one gripper arm is attached.

7. The fish harvesting head of claim 1, wherein each barb arm includes a gripper arm.

8. The fish harvesting head of claim 1, wherein the at least one barb arm pivots between a closed position generally parallel to a longitudinal axis of the harvesting body and an open position generally orthogonal to a longitudinal axis of the harvesting body.

9. The fish harvesting head of claim 1, wherein the forward portion of the harvesting body has a distal piercing tip including a releasable connection device attachable to the connection device on the forward portion of the harvesting body for removably securing the piercing tip to the harvesting body and for preventing rotation of the barb arms forward beyond a generally orthongonal orthogonal position relative to the longitudinal axis of the harvesting body.

10. A fish harvesting head, comprising:
a harvesting body having a forward portion and a rear portion, wherein the forward portion includes a forward connection device and the rear portion includes a rear connection device for attachment to a shaft;
a plurality of barb receiving slots positioned in the harvesting body, wherein each barb receiving slot extends along the harvesting body and includes an opening in an outer surface of the harvesting body through which a portion of a barb arm protrudes;

at least one barb arm protruding from at least one of the barb receiving slots;

where at least one of the barb arms has at least one proximal end attached to the harvesting body in the barb receiving slot via at least one connector extending from a first receiver in a first side of the barb receiving slot, through an orifice in the barb arm, and into a second receiver in a second side of the barb receiving slot;

at least one gripper arm extending from at least one barb arm nonorthogonal and nonparallel with the at least one barb arm;

wherein the at least one gripper arm extends at a nonorthogonal and nonparallel angle relative to the at least one barb arm in a first direction relative to a longitudinal axis of the harvesting body and extends at a nonorthogonal and nonparallel angle relative to the at least one barb arm in a second direction relative to the longitudinal axis of the harvesting body that is orthogonal to the first direction; and wherein the at least one gripper arm is nonlinear such that the at least one gripper arm is curved to mate with an outer surface of the harvesting body when the at least one barb arm with the at least one gripper arm is in a closed positioned against the harvesting body.

11. The fish harvesting head of claim 10, wherein the at least one gripper arm is formed from a base section and a tip section, and wherein the base section is nonparallel and nonorthogonal with the tip section.

12. The fish harvesting head of claim 11, wherein the tip section extends from a distal end of the base section more in a direction towards a base of the harvesting body than the base section.

13. The fish harvesting head of claim 10, wherein a leading edge of the at least one gripper arm is tapered to reduce drag and to create a force directed toward the longitudinal axis of the harvesting body when the harvesting body is driven into a body, such as a fish, to keep the at least one gripper arm and the at least one barb arm to which the at least one gripper arm is attached resting against the harvesting body while the harvesting body is driven into a body.

14. The fish harvesting head of claim 10, wherein the at least one gripper arm has a length less than one half a length of the barb arm to which the at least one gripper arm is attached.

15. The fish harvesting head of claim 10, wherein each barb arm includes a gripper arm.

16. The fish harvesting head of claim 10, wherein the at least one barb arm pivots between a closed position generally parallel to a longitudinal axis of the harvesting body and an open position generally orthogonal to a longitudinal axis of the harvesting body.

17. The fish harvesting head of claim 10, wherein the forward portion of the harvesting body has a distal piercing tip including a releasable connection device attachable to the connection device on the forward portion of the harvesting body for removably securing the piercing tip to the harvesting body and for preventing rotation of the barb arms forward beyond a generally orthogonal position relative to the longitudinal axis of the harvesting body.

* * * * *